United States Patent [19]

Deland

[11] Patent Number: 4,529,023
[45] Date of Patent: Jul. 16, 1985

[54] TRACTION DEVICE FOR TIRES

[75] Inventor: François Deland, St-Hilaire, Canada

[73] Assignee: 121004 Canada Inc., Saint-Sulpice, Canada

[21] Appl. No.: 475,067

[22] Filed: Mar. 14, 1983

[51] Int. Cl.³ .............................................. B60C 27/20
[52] U.S. Cl. ................................ 152/225 R; 152/218; 301/44 T
[58] Field of Search ............................ 301/44 R, 44 T; 152/225 R, 225 C, 226, 227, 228, 218

[56] References Cited

U.S. PATENT DOCUMENTS

| | | |
|---|---|---|
| D. 238,770 | 2/1976 | Lewis . |
| 1,863,187 | 6/1932 | Carey . |
| 2,174,345 | 9/1939 | Worthing . |
| 2,423,759 | 7/1947 | Edwards .......................... 152/225 R |
| 2,436,549 | 2/1948 | Boyer . |
| 2,445,913 | 7/1948 | Grosjean et al. ................ 152/225 R |
| 2,456,544 | 12/1948 | Varner ............................ 152/225 R |
| 2,559,425 | 7/1951 | Haracz . |
| 2,575,263 | 11/1951 | Eisenhauer, Sr. ............... 152/225 R |
| 2,581,578 | 1/1952 | Cruse . |
| 2,601,882 | 7/1952 | Eisenhauer ..................... 152/225 R |
| 2,746,508 | 5/1956 | Doughty .............................. 152/218 |
| 2,748,826 | 6/1956 | Dore . |
| 2,912,036 | 11/1959 | Minutilla . |
| 3,031,000 | 4/1962 | Sebena . |
| 3,079,972 | 3/1963 | Forman . |
| 3,115,920 | 12/1963 | Sand, Sr. . |
| 3,151,654 | 10/1964 | Minutilla . |
| 3,437,121 | 4/1969 | Strapko et al. ................... 152/223 X |
| 3,850,216 | 11/1974 | Sanvitale . |
| 3,861,752 | 1/1975 | Thurre et al. ....................... 301/44 T |
| 4,089,359 | 5/1978 | Jones . |
| 4,246,691 | 1/1981 | Ulmer . |

FOREIGN PATENT DOCUMENTS

| | | | |
|---|---|---|---|
| 733798 | 5/1966 | Canada . | |
| 478678 | 11/1969 | Switzerland ........................ 152/226 |

Primary Examiner—David A. Scherbel
Attorney, Agent, or Firm—Schwartz, Jeffery, Schwaab, Mack, Blumenthal & Evans

[57] ABSTRACT

The disclosure describes a traction device for mounting on a tire without having to remove the hub cap of a tire wheel on which the tire is mounted. The device comprises a plurality of radially extending arms which are pivotally connected at their inner ends to a common connector and a hook formed at the other end of each arm, the hook being shaped to embrace the tread surface and at least part of the side-walls of the tire. The hook is formed with a friction plate. The device is so constructed that when it is mounted on a tire, the common connector and the inner ends of the radial arms are spacedly and outwardly centrally aligned with respect to the hub of the tire wheel for easier mounting. Finally, the arms are tightened together so as to prevent slipping of the hooks over the tread surface when the tire rotates.

4 Claims, 5 Drawing Figures

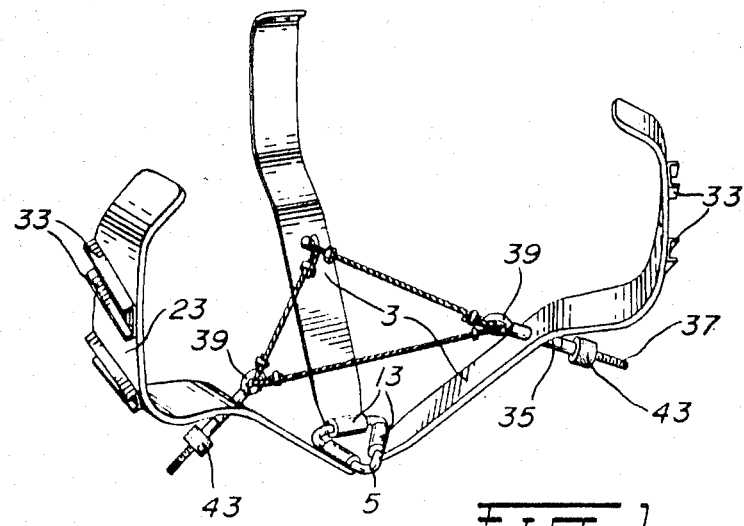
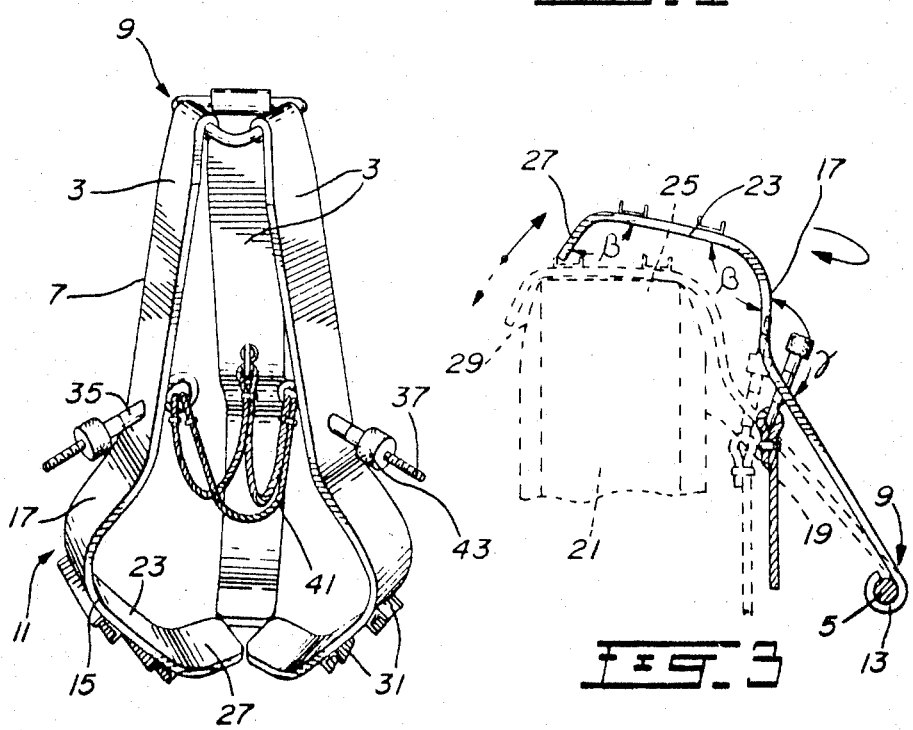

TRACTION DEVICE FOR TIRES

BACKGROUND OF THE INVENTION (a) Field of the invention

This invention relates to a traction device for a tire. More particularly, the invention relates to a device for mounting on a tire without having to remove the hub cap of a tire wheel on which the tire is mounted.

(b) Description of the Prior Art

Everyone knows that, on all difficult terrain in spite of the common use of snow tires, very often a car becomes stuck into snow or over a sheet of ice. This always creates difficulties. There is presently available on the market a device sold under the Trademark "TRACTION AID" which could enable a car to be disengaged from a position where at least one of the back wheels keeps slipping without moving the car. The TRACTION AID is shaped in the form of a ladder and is provided with gripping studs to engage the ground surface. The disadvantage of such a device is that once the wheel has advanced over the length of the device if the car is not completely disengaged from the slippery position, the operation has to be started again. On the other hand, especially when it is very slippery, the TRACTION AID can be thrown at a high speed at a good distance. One can lose it in snow or it can be quite dangerous to a person who happens to be in the vicinity of the car.

There is therefore a need for a traction device which is easy to mount, stays in position over a tire until the car is completely disengaged and is not dangerous.

Applicant is aware of the following U.S. Pat. Nos. in prior art:

1,863,187 June 14, 1932: Carey
2,174,345 Sept. 26, 1939: Worthing
2,423,759 July 8, 1947: Edwards
2,436,549 Feb. 24, 1948: Boyer
2,456,544 Dec. 14, 1948: Varner
2,559,425 July 3, 1951: Haracz
2,581,578 Jan. 8, 1952: Cruse
2,748,826 June 5, 1956: Dore
2,912,036 Nov. 10, 1959: Minutilla
3,031,000 Apr. 24, 1962: Sebena
3,079,972 Mar. 5, 1963: Forman
3,115,920 Dec. 31, 1963: Sand Sr.
3,151,654 Oct. 6, 1964: Minutilla
3,437,121 Apr. 8, 1969: Strapko et al
3,850,216 Nov. 26, 1974: Sanvitale
4,089,359 May 16, 1978: Jones
4,246,691 Jan. 27, 1981: Ulmer
Des. 238,770 Feb. 10, 1976: Lewis
and Canada 733,798 May 10, 1966: Patterson All the devices of the prior art show gripping means to be firmly mounted over a tire enabling a car to pull out of a difficult terrain such as in mud or ice. However, all of these devices are not easy to mount and most of them would need the removal of the hub cap and a difficult operation to be installed. In Applicant's view the closest prior art is U.S. Pat. Nos. 2,436,549 and 2,456,544 especially the latter. However, as shown in FIG. 2 of the drawings of U.S. Pat. No. 2,456,544, the hub cap creates a problem and it is believed that the device illustrated therein is not susceptible for mounting on any kind of vehicle. The same is true with respect to the Boyer device.

The remaining references are considered to be irrelevant prior art by the Applicant.

SUMMARY OF THE INVENTION

In order to overcome the disadvantages of the devices taught by the prior art, there is provided a traction device for mounting on a tire without having to remove the hub cap of a tire wheel on which the tire is mounted, comprising a plurality of radially extending arms, a common connector, means for pivotally connecting the inner ends of the radial arms to the common connector, a hook formed at the other end of each arm, the hook being shaped to embrace the tread surface and at least part of the side-walls of the tire, the hook having means thereon to define therewith a friction plate, means to cause the common connector having the inner ends of the arms pivotally connected thereto to be spacedly and outwardly centrally aligned with to the hub cap of the tire wheel, when the traction device is mounted over the tire, and means to tighten the arms relative to one another and to the common connector so as to prevent slipping of the hooks over the tread surface when the tire rotates.

In accordance with a preferred embodiment according to the invention, there are provided three radially extending arms each forming substantially identical angles between one another.

In order to make sure that the above angles are maintained, the common connector is preferably shaped as an equilateral triangle.

Preferably, each arm comprises a straight portion between the inner end and the outer end thereof, the inner end being curled over one side of the equilateral triangular common connector in a manner to enable the arm to pivot with respect to the common connector.

In accordance with another preferred embodiment of the invention, the hook comprises a first length of arm past the straight portion, adapted to rest against the outer side-wall of the tire, followed by a flat portion which is wide enough to cover the tread surface, and a terminal portion of arm adapted to rest against the inner side-wall of the tire, both the first length and the terminal portion of the arm being diverging and forming an obtuse angle with respect to the flat portion.

Although the friction means may be designed in any manner known to the art, it is preferred to provide a plurality of U-shaped members, which are fixed at the base thereof on the flat portion with outwardly projecting legs capable of gripping into slippery ground, the U-shaped members being angularly disposed on the flat portion to give better traction.

According to another preferred embodiment of the invention, the straight portion of the arm defines an obtuse angle with respect to the first length thereof so that when the traction device is mounted over a tire, the inner ends which are pivotally connected to the common connector will appear spacedly and outwardly aligned with respect to the center of the hub cap.

Although any means can be used to tighten the device over the tire, it has been found preferable to use flexible linkages between the radially extending arms and to pull on the linkages to provide a firm contact between the hooks and the tire.

Preferably, each straight portion has a transverse sleeve formed therein at the same level on respective straight portions, an eyelet bolt is mounted in each sleeve with the eyelet on the side of the arm facing the tire wheel and the free end on the opposite side, a length of cable is engaged by each eyelet, and a nut engages the free end of the eyelet bolt to draw it and to tighten the cable thereby rigidifying the traction device over the tire.

BRIEF DESCRIPTION OF DRAWINGS

In the drawings which illustrate the invention,

FIG. 1 is a perspective view of the device in open position;

FIG. 2 is a perspective view of the device in closed storing position;

FIG. 3 is a view showing the mounting of the device over a tire and the tightening thereof;

DESCRIPTION OF PREFERRED EMBODIMENTS

Figure 4:
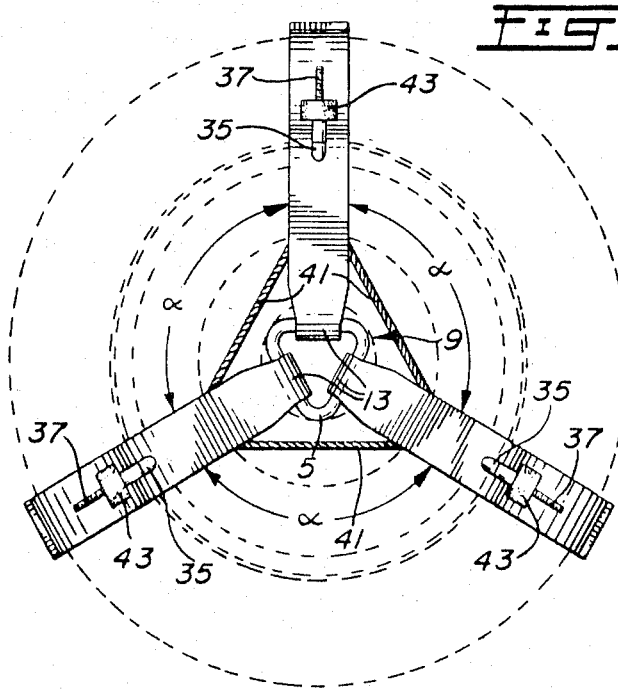
FIG. 4 shows a front view of the device mounted over a tire.

Referring to the drawings, it will seen that the traction device according to the invention is very easy to open for mounting over a tire as shown in FIG. 1, and to close for storing, as shown in FIG. 2. The particular angles between the various parts of the device will enable it to clear the hub cap in practically all known situations as shown in FIG. 3.

The device comprises three radially extending arms 3, which, when mounted over a tire will each form substantially identical angles and between one another. Another element of the device illustrated in the drawings, is a common connector 5 which is shaped as an equilateral triangle, the purpose of which will be discussed later.

Each arm comprises a straight portion 7 between the inner end 9 and the outer end 11 of the arm. The inner end is curled as a sleeve 13 which can rotate over one side of the equilateral triangular common connector 5, in a manner to enable the arm 3 to pivot with respect to the common connector 5. This is clearly shown in FIGS. 1, 2 and 3.

At the outer end 11 of the arm, the latter is formed into a hook 15. The hook comprises a first length 17 past the straight portion 7 of the arm 3. The first length 17, as shown particularly in FIG. 3, should be adjacent at least part of the outer wall 19 of the tire 21 when it is mounted thereon. The first length 17 is followed by a flat portion 23 which is wide enough to cover the tread surface 25 of the tire 21. Finally, the hook comprises a terminal portion 27 of the arm 3 which should be adjacent at least part of the inner side-wall 29 when the device is mounted over the tire. It should also be noted that both the first length 17 and the terminal portion 27 of the arm 3 are diverging with respect to one another, as particularly shown in FIG. 3 and that they form a substantially similar obtuse angle $\beta$ with respect to the flat portion 23.

A pair of U-shaped members 31 is fixed at the base thereof on each flat portion. Of course, the flat portion 23 could also comprise 1 or 3 or more U-shaped members 31, depending on the purpose of the manufacturer or user. Each U-shaped member 31 has outwardly projecting legs 33 which can grip into difficult terrain, and will enable the vehicle to get out of a slippery position. As shown in FIG. 1, the U-shaped members 31 are angularly disposed on the flat portion 23 to give better traction.

Each straight portion 7 of the arm 3 defines an obtuse angle $\nu$ with respect to the first length 17 of the hook.

The result is that when the traction device is mounted over a tire, the inner ends 9 which are pivotally connected to the equilateral triangular connector 5 by means of their sleeves 13 will appear spacedly and outwardly aligned with respect to the hub cap (not shown).

Figure 5:
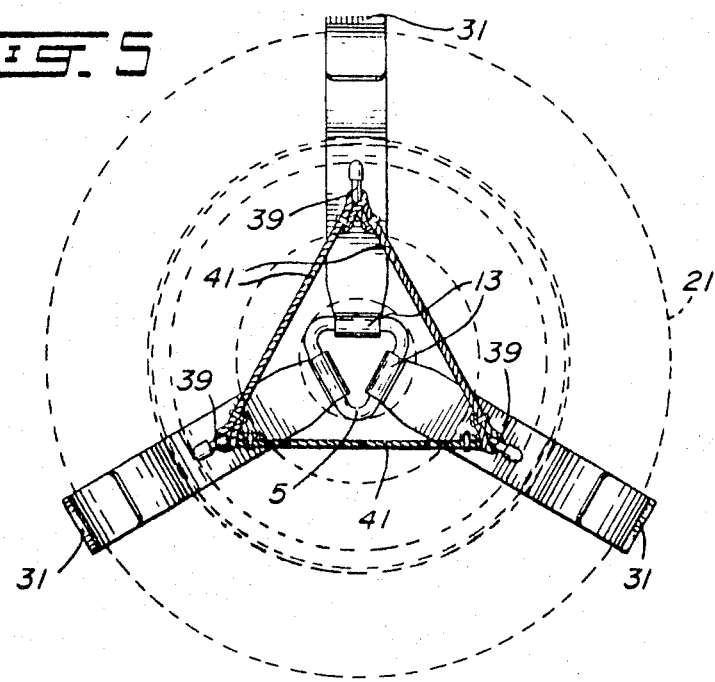
FIG. 5 shows the same device viewed from the rear.

Each straight portion 7 has a transverse sleeve 35 formed therein and each sleeve appears on the same level on each of the straight portions 7 all as clearly shown in the drawings. An eyelet bolt 37 is mounted in each sleeve 35 with the eyelet 39 on the side of the arm facing the tire wheel and the free end on the opposite side. This is all clearly illustrated in FIG. 3 of the drawings. A length of cable 41 is engaged by each eyelet 39, as particularly shown in FIGS. 1, 3 and 5. A nut 43 engages the free end 37 of the eyelet bolt to draw the latter and to tighten the cable as particularly shown in FIG. 3 of the drawings thereby rigidifying the traction device over the tire.

The device is easy to mount over a tire. It is merely sufficient to open it as shown in FIG. 1 of the drawings. The three legs are then partially placed over the tire and with the ring 43, the device is tightened until it is solid over the tire. Then it can stay in place until the vehicle has managed to be driven back on non-slippery ground. If desired, the device can obviously remain mounted on the tire for any given period of time.

I claim:

1. Traction device for mounting on a tire without having to remove the hub cap of a tire wheel on which said tire is mounted, comprising:

three radially extending arms, each forming substantially identical angles between one another, a common connector which is shaped as an equilateral triangle, each said arm comprising a straight portion between the inner end and the other end thereof, said inner end having a sleeve rolling over one side of said equilateral triangular common connector in a manner to enable said arm to pivot with respect to said connector, at least one hook formed at the other end of each said arm, said hook comprising a first length of said arm past said straight portion adapted to be adjacent the outer side wall of said tire, followed by a flat portion wide enough to cover said tread surface, and a terminal portion of said arm adapted to be adjacent the inner side wall of said tire, both said portion first length and said terminal portion of said arms being diverging and forming an obtuse angle with respect to said flat portion, said hook being shaped to embrace the tread surface and at least part of the side walls of said tire, said hook having means thereon to define therewith a friction plate, said means comprising a plurality of U-shaped members fixed at the base thereof on said flat portion with outwardly projecting legs capable of gripping into slippery ground, said U-shaped members being angularly disposed on said flat portion to give better traction, means to cause said common connector having the inner ends of said arms pivotally connected thereto, to be spacedly and outwardly centrally aligned with respect to the hub cap of said tire wheel, when said traction device is mounted over said tire, and means to tighten said arms relative to one another and to said common connector so as to prevent slipping of said hooks over said tread surface when said tire rotates, said straight portion of said arm defining an obtuse angle with respect to said first length thereof so that when said traction device is mounted over a tire, said inner ends pivotally connected to said equilateral triangular common connector will appear spacedly and outwardly aligned with respect to the center of said hub cap.

2. Traction device according to claim 1, which comprises flexible linkages between said radially extending arms and means to pull on said linkages to provide a firm contact between said hooks and said tire.

3. Traction device according to claim 2, wherein each said straight portion has a transverse sleeve formed therein at the same level on respective straight portions, an eyelet bolt mounted in each said sleeve with the eyelet on the side of the arm facing the tire wheel and the free end on the opposite side, a length of cable engaged by each said eyelet and a nut engaging the free end of said eyelet bolt to draw same and to tighten said cable thereby rigidifying said traction device over said tire.

4. Traction device for mounting on a tire without having to remove the hub cap of a tire wheel on which said tire is mounted, comprising:

at least three radially extending arms, each forming substantially identical angles between one another, a common connector which is shaped as an equilateral triangle, each said arm comprising a straight portion between an inner end and an outer end thereof, the inner end having a sleeve rolling over one side of said equilateral triangular common connector in a manner to enable said arm to pivot with respect to said common connector, a hook formed at the outer end of each said arm, said hook comprising a first length of said arm past said straight portion, said first length being adapted to be adjacent at least part of the outer side wall of said tire, said first length being followed by a flat portion which is wide enough to cover the tread surface of said tire, and a terminal portion of said arm which is adapted to be adjacent at least part of the inner side wall of said tire, both said first length and said terminal portion of said arms being diverging with respect to one another and forming a substantially similar obtuse angle with respect to said flat portion, a plurality of U-shaped members fixed at the base thereof on said flat portion with outwardly projecting legs capable of gripping into slippery ground, said U-shaped members being angularly disposed on said flat portion to give better traction, said straight portion of said arm defining an obtuse angle with respect to said first length thereof so that when said traction device is mounted over a tire, said inner ends pivotably connected to said equilateral triangular connector will appear spacedly and outwardly centrally aligned with respect to said hub cap, each said straight portion having a transverse sleeve formed therein at the same level on respective straight portions, an eyelet bolt mounted in each said sleeve with the eyelet on the side of said arm facing the tire wheel and the free end on the opposite side, a length of cable engaged by each said eyelet, and a nut engaging the free end of said eyelet bolt to draw same and to tighten said cable thereby rigidifying said traction device over said tire.

* * * * *